US008677464B2

(12) United States Patent
Smith et al.

(10) Patent No.: US 8,677,464 B2
(45) Date of Patent: Mar. 18, 2014

(54) SYSTEMS AND METHODS FOR MANAGING SECURE COMMUNICATION SESSIONS WITH REMOTE DEVICES

(75) Inventors: Rhett Smith, Moscow, ID (US); Ryan Bradetich, Pullman, WA (US); Christopher Ewing, Pullman, WA (US); Nathan Paul Kipp, Redmond, WA (US); Kimberly Ann Yauchzee, Troy, ID (US)

(73) Assignee: Schweitzer Engineering Laboratories Inc., Pullman, WA (US)

( * ) Notice: Subject to any disclaimer, the term of this patent is extended or adjusted under 35 U.S.C. 154(b) by 270 days.

(21) Appl. No.: 13/166,648

(22) Filed: Jun. 22, 2011

(65) Prior Publication Data

US 2012/0331534 A1    Dec. 27, 2012

(51) Int. Cl.
  *G06F 7/04* (2006.01)
  *G06F 15/16* (2006.01)
  *G06F 17/30* (2006.01)
  *H04L 29/06* (2006.01)

(52) U.S. Cl.
  USPC .............................................. 726/6; 713/153

(58) Field of Classification Search
  None
  See application file for complete search history.

(56) References Cited

U.S. PATENT DOCUMENTS

| | | |
|---|---|---|
| 4,754,482 A | 6/1988 | Weiss |
| 5,054,068 A | 10/1991 | Hess |
| 5,289,468 A | 2/1994 | Yoshida |
| 5,754,939 A | 5/1998 | Herz |
| 6,212,662 B1 | 4/2001 | Hekstra |
| 6,259,706 B1 | 7/2001 | Shimada |
| 6,542,464 B1 | 4/2003 | Takeda |
| 6,571,279 B1 | 5/2003 | Herz |
| 7,076,797 B2 | 7/2006 | Loveland |
| 7,216,043 B2 | 5/2007 | Ransom |
| 7,224,796 B2 | 5/2007 | Watanabe |
| 7,304,586 B2 | 12/2007 | Wang |
| 7,389,357 B2 | 6/2008 | Duffie |
| 7,460,536 B1 | 12/2008 | Williams |
| 7,540,022 B2 | 5/2009 | Barari |
| 7,599,748 B2 | 10/2009 | Dove |
| 7,680,273 B2 | 3/2010 | Whitehead |
| 7,724,657 B2 | 5/2010 | Rao |
| 7,818,582 B2 | 10/2010 | Marion |
| 7,843,897 B2 | 11/2010 | Casebolt |
| 7,895,644 B1 | 2/2011 | Thakur |

(Continued)

OTHER PUBLICATIONS

EtherPoll, Jan. 27, 2004.

(Continued)

*Primary Examiner* — Nadia Khoshnoodi
(74) *Attorney, Agent, or Firm* — Jared L. Cherry

(57) ABSTRACT

According to various embodiments, a session manager generates, stores, and periodically updates the login credentials for each of a plurality of connected IEDs. An operator, possibly via an access device, may provide unique login credentials to the session manager. The session manager may determine the authorization level of the operator based on the operator's login credentials, defining with which IEDs the operator may communicate. According to various embodiments, the session manager does not facilitate a communication session between the operator and a target IED. Rather, the session manager maintains a first communication session with the operator and initiates a second communication session with the target IED. Accordingly, the session manager may forward commands transmitted by the operator to the target IED. Based on the authorization level of the operator, a session filter may restrict what may be communicated between an operator and an IED.

26 Claims, 9 Drawing Sheets

| Session Manager Credential Management of Multiple IEDs ||||||
|---|---|---|---|---|---|
| Connected IEDs | Type | Connection | Available Levels of Access | Generated Operator Name | Generated Password |
| IED 1 | Legacy | Serial | Admin | Random Operator Name A | Random Operator Name A |
| IED 2 | Improved | Ethernet | Admin | Random Operator Name B | Random Password B |
| | | | High Level | Random Operator Name C | Random Password C |
| | | | Medium Level | Random Operator Name D | Random Password D |
| | | | Low Level | Random Operator Name E | Random Password E |
| | | | Customized | Random Operator Name F | Random Password F |
| IED 3 | Improved | Ethernet | Custom 1 | Random Operator Name G | Random Password G |
| | | | Custom 2 | Random Operator Name H | Random Password H |
| | | | ... | ... | ... |
| | | | Custom N | Random Operator Name N | Random Password N |
| ... | ... | ... | ... | ... | ... |
| IED N | Legacy | Serial | Admin | Random Operator Name K | Random Operator Name K |

(56) References Cited

U.S. PATENT DOCUMENTS

| | | | |
|---|---|---|---|
| 7,950,051 B1* | 5/2011 | Spitz et al. | 726/6 |
| 7,958,544 B2 | 6/2011 | Chen | |
| 2001/0052072 A1 | 12/2001 | Jung | |
| 2002/0003881 A1 | 1/2002 | Reitmeier | |
| 2003/0070091 A1 | 4/2003 | Loveland | |
| 2003/0147420 A1 | 8/2003 | Beckwith | |
| 2004/0028033 A1 | 2/2004 | Koistinen | |
| 2004/0073788 A1 | 4/2004 | Kim | |
| 2004/0138786 A1 | 7/2004 | Blackett | |
| 2005/0005093 A1 | 1/2005 | Bartels | |
| 2005/0039040 A1* | 2/2005 | Ransom et al. | 713/200 |
| 2005/0175182 A1 | 8/2005 | Ueno | |
| 2006/0039355 A1 | 2/2006 | Rao | |
| 2006/0077999 A1 | 4/2006 | Kagan | |
| 2006/0083260 A1 | 4/2006 | Wang | |
| 2006/0140146 A1 | 6/2006 | Funk | |
| 2006/0170409 A1 | 8/2006 | Kagan | |
| 2006/0238932 A1 | 10/2006 | Westbrock | |
| 2007/0006291 A1 | 1/2007 | Barari | |
| 2007/0055889 A1* | 3/2007 | Henneberry et al. | 713/186 |
| 2008/0022377 A1 | 1/2008 | Chen | |
| 2008/0162930 A1* | 7/2008 | Finney et al. | 713/165 |
| 2009/0265124 A1 | 10/2009 | Kagan | |
| 2010/0002879 A1 | 1/2010 | Risley | |
| 2010/0046545 A1 | 2/2010 | Kagan | |
| 2010/0082792 A1* | 4/2010 | Johnson | 709/223 |
| 2010/0180338 A1 | 7/2010 | Stewart | |
| 2010/0325687 A1 | 12/2010 | Iverson | |

OTHER PUBLICATIONS

John A. Kinast, AGA, 12 part 2 draft, American Gas Association, Jan. 23, 2006.

PCT/US2012/043593 Patent Cooperation Treaty, International Search Report and Written Opinion of the International Searching Authority, Aug. 24, 2012.

* cited by examiner

FIG. 7

Session Manager
Credential Management of Multiple IEDs

| Connected IEDs | Type | Connection | Available Levels of Access | Generated Operator Name | Generated Password |
|---|---|---|---|---|---|
| IED 1 | Legacy | Serial | Admin | Random Operator Name A | Random Operator Name A |
| IED 2 | Improved | Ethernet | Admin | Random Operator Name B | Random Password B |
|  |  |  | High Level | Random Operator Name C | Random Password C |
|  |  |  | Medium Level | Random Operator Name D | Random Password D |
|  |  |  | Low Level | Random Operator Name E | Random Password E |
|  |  |  | Customized | Random Operator Name F | Random Password F |
| IED 3 | Improved | Ethernet | Custom 1 | Random Operator Name G | Random Password G |
|  |  |  | Custom 2 | Random Operator Name H | Random Password H |
|  |  |  | ... | ... | ... |
|  |  |  | Custom N | Random Operator Name N | Random Password N |
| ... | ... | ... | ... | ... | ... |
| IED N | Legacy | Serial | Admin | Random Operator Name K | Random Operator Name K |

Session Manager
Access Device Credential and Authorization Manager

| Operator Names | Operator Passwords | Authorization Level | |
|---|---|---|---|
| | | Connected IEDs | Level of Access |
| Operator 1 | Password 1 | IED 1 (Legacy) | Admin |
| | | IED 2 (Improved) | Med. Level Operator |
| | | IED 3 (Improved) | Low Level Operator |
| | | ... | ... |
| | | IED N (Legacy) | Admin |
| Operator 2 | Password 2 | IED 1 (Legacy) | Admin |
| | | IED 2 (Improved) | Med. Level Operator |
| | | IED 3 (Improved) | Low Level Operator |
| | | ... | ... |
| | | IED N (Legacy) | Admin |
| Operator 3 | Password 3 | IED 1 (Legacy) | Admin |
| | | IED 2 (Improved) | Low Level Operator |
| | | IED 3 (Improved) | Low Level Operator |
| | | ... | ... |
| | | IED N (Legacy) | Admin |
| ... | ... | ... | ... |
| Operator N | Password N | IED 1 (Legacy) | Admin |
| | | IED 2 (Improved) | Admin |
| | | IED 3 (Improved) | Admin |
| | | ... | ... |
| | | IED N (Legacy) | Admin |

Session Manager
Enhanced Security with Session Filter

| Operator Names | Operator Passwords | Authorization Level | | |
|---|---|---|---|---|
| | | Connected IEDs | Level of Access | Filtered Commands |
| Operator 1 | Password 1 | IED 1 (Legacy) | Admin | Password Changes |
| | | IED 2 (Improved) | Med. Level | Password Changes |
| | | IED 3 (Improved) | Low Level | Password Changes |
| | | ... | ... | ... |
| | | IED N (Legacy) | Admin | Effectively Low Level |
| Operator 2 | Password 2 | IED 1 (Legacy) | Admin | Effectively High Level |
| | | IED 2 (Improved) | Med. Level | Password Changes |
| | | IED 3 (Improved) | Low Level | Password Changes |
| | | ... | ... | ... |
| | | IED N (Legacy) | Admin | Effectively Med. Level |
| Operator 3 | Password 3 | IED 1 (Legacy) | NONE | NONE |
| | | IED 2 (Improved) | NONE | NONE |
| | | IED 3 (Improved) | Low Level | Password Changes |
| | | ... | ... | ... |
| | | IED N (Legacy) | Admin | Effectively Low Level |
| ... | ... | ... | ... | ... |
| Operator N | Password N | IED 1 (Legacy) | Admin | Password Changes |
| | | IED 2 (Improved) | Admin | Password Changes |
| | | IED 3 (Improved) | Admin | Password Changes |
| | | ... | ... | ... |
| | | IED N (Legacy) | Admin | Password Changes |

900

SYSTEMS AND METHODS FOR MANAGING SECURE COMMUNICATION SESSIONS WITH REMOTE DEVICES

TECHNICAL FIELD

This disclosure generally relates to systems and methods for managing secure communication sessions. More particularly, the systems and methods disclosed herein may be implemented in gateways, firewalls, and other network devices and may be configured to implement modern access control paradigms across a variety of networked devices.

BRIEF DESCRIPTION OF THE DRAWINGS

Non-limiting and non-exhaustive embodiments of the disclosure are described, including various embodiments of the disclosure with reference to the figures, in which:

FIG. 7 illustrates a representative table for managing the login credentials and connections of a plurality of IEDs to an embodiment of a session manager.

FIG. 8 illustrates a representative table for managing the login credentials and associated authorization level granted to each of a plurality of access devices by a session manager.

FIG. 9 illustrates a representative table for managing the login credentials and associated authorization levels granted to each of a plurality of access devices by a session manager including a session filter.

Figure 1:
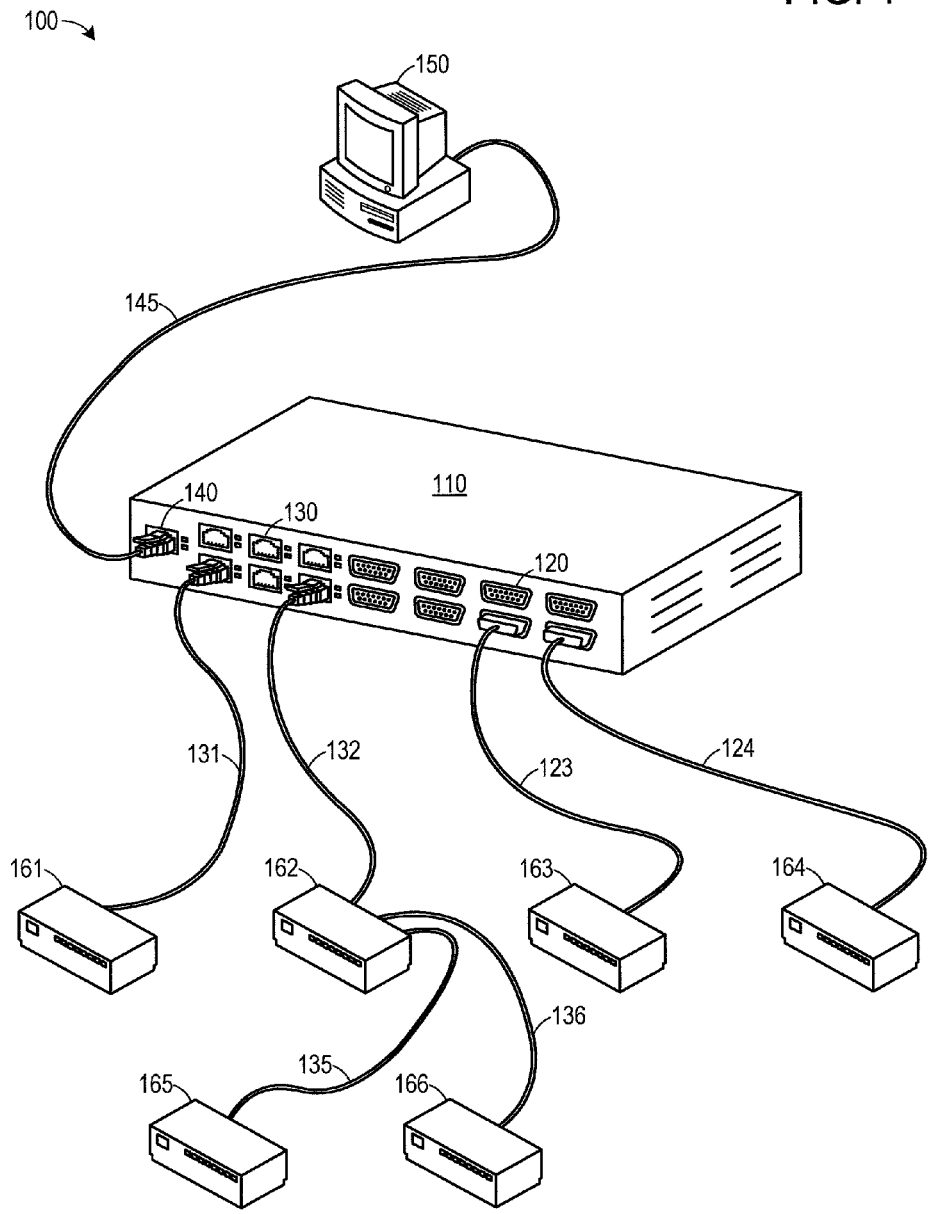
FIG. 1 illustrates one embodiment of a gateway session managing system including a session manager, multiple intelligent electronic devices (IEDs), and an operator access device.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides systems and methods for managing access to a plurality of intelligent electronic devices (IEDs). According to various embodiments, the built-in security measures of existing IEDs vary greatly. For example, legacy IEDs may not distinguish between unique users and may include username/password combinations that are limited in length and/or character set. Even using modern IEDs, which may allow for the creation of numerous complex username/password combinations, it may be difficult to manage and update a large number of login credentials across a network of IEDs.

According to various embodiments disclosed herein, a session manager may be configured to manage and update the login credentials of a plurality of networked IEDs. Additionally, a session manager may manage a plurality of access device login credentials. According to various embodiments, a session manager may be configured with a variety of network ports and may communicate using a wide variety of communication protocols. For example, a session manager may be configured with serial ports and Ethernet ports and may communicate and/or translate between various protocols associated with various types of physical network connections.

According to various embodiments, the session manager is configured to set the login credentials for each access level of each connected IED. Additionally, the session manager may be configured to reset and update the login credentials at a specified time interval. For example, the login credentials of each connected IED may be reset and updated annually to comply with applicable regulations.

The session manager may be configured to assign login credentials to each associated IED that are as strong as each IED allows. For example, a legacy IED may only allow a single username and password combination of limited length and character set, while a more modern IED may allow for multiple usernames and/or passwords having expanded lengths and/or character sets.

According to various embodiments, an operator may access a remote IED via the session manager. The operator may be required to provide a username and password to the session manager in order to obtain access to a particular IED. According to various embodiments, the operator may communicate with a session manager using an access device connected to the session manager. The session manager may be configured to maintain and manage a plurality of login credentials associated with a plurality of operators, access devices, and/or combinations thereof. According to various embodiments, a session manager may require an access device, or the operator thereof, to provide login credentials in order to gain access to networked IEDs. An authorization level may be associated with each operator that specifies the IEDs with which the operator may communicate. Additionally, some operators may have limited access to some IEDs while others may have full access.

A session manager may include a session filter configured to suppress communication between an operator and a networked IED that is not within the authorization level of the operator. For example, a session filter may prevent all operators and/or access devices from changing the login credentials of a networked IED. Additionally, a session filter may be configured to suppress commands sent by an operator and/or access device to a particular IED that are on a blacklist of commands.

An operator desiring to initiate a communication session with a particular IED may initially contact the session manager. The operator and/or access device may then be required to provide login credentials, such as a username and password(s). The session manager may analyze the provided login credentials to determine the authorization level of the operator and/or access device. The operator may then specify an IED with which to communicate. If the specified IED is within the authorization level of the provided login credentials, the session manager may provide appropriate login credentials to the specified IED in order to initiate a communication session between the IED and the session manager. The operator and/or access device may then transmit a command intended for the IED to the session manager. The command may be analyzed by the session filter, and if the command issued by the operator satisfies the criteria enforced by the session filter, the command may be forwarded to the target IED. Likewise, the session manager may forward information sent by the target IED to the access device.

According to certain embodiments, a session manager may maintain records of access events, including commands and information sent between access devices and IEDs and the associated login credentials of the operators and/or access devices. As described herein, a session manager allows for the application of uniform modern security standards and practices across a plurality of networked IEDs and access devices, even when some legacy IEDs and/or access devices may not conform to or provide for modern security practices.

Operators and/or access devices may provide login credentials to a session manager in order to gain access to each of the IEDs with which the operator is authorized to communicate. This may eliminate the need for an operator to remember (or more likely write down, which introduces additional security issues) the login credentials for each of a plurality of IEDs. Moreover, in some industries, such as electrical power generation and monitoring, regulations mandate minimum security requirements and periodic password changes. The presently described session manager may automate the task of updating hundreds or even thousands of username/password combinations.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture (such as a computer-readable storage medium), a method, and/or a product of a process.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For instance, an IED may be connected to a gateway session manager through one or more intermediary IEDs or networking devices. Such networks may be modeled as tree structures, as is common in the art.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including but not limited to multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

As used herein, the term "login credentials" may refer to any type of authentication method known to be useful in the art. For example, login credentials commonly refer to an ASCII encoded username and password combination; accordingly, the terms "login credentials" and "username and password(s)" may be used interchangeably herein. However, username and password(s) may be replaced with any of a wide variety of authentication protocols and/or techniques including cryptographic protocols for authenticating machines, challenge-response methods, zero-knowledge proofs, time-synchronized single use passwords, security tokens, biometric authentication, graphical or other non-text based passwords, voice authentication, and the like.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include one or more local area networks, wide area networks, metropolitan area networks, and/or "Internet" or internet protocol (IP) networks, such as the World Wide Web, a private Internet, a secure Internet, a value-added network, a virtual private network, an extranet, an intranet, or even standalone machines that communicate with other machines by physical transport of media. In particular, a suitable network may be formed from parts or entireties of two or more other networks, including networks using disparate hardware and network communication technologies. A network may incorporate landlines, wireless communication, and combinations thereof.

The network may include communications or networking software, such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires"." The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody programs, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates one embodiment of a system 100, including a session manager 110, a plurality of intelligent electronic devices (IEDs) 161, 162, 163, 164, 165, and 166, and an operator access device 150. As illustrated, session manager 110 may include multiple ports 120, 130, and 140. According to various embodiments, the ports may include serial ports 120 and Ethernet ports 130 and 140. According to other embodiments, a session manager 110 may include optical ports, USB ports, SATA ports, and/or alternative ports. As illustrated, IEDs 161 and 162 are connected to session manager 110 via Ethernet cables 131 and 132. IEDs 165 and 166 are connected via Ethernet and/or serial cables 135 and 136 to IED 162, and ultimately to session manager 110 via Ethernet cable 132. IEDs 163 and 164 are IEDs connected to session manager 110 via serial cables 123 and 124. According to various embodiments, session manager 110 may maintain a model of all networked devices, their types, communication protocols, and interconnections as a tree.

One or more ports of session manager 110 may be designated as a master port 140 for communication with an operator access device 150, while others ports, such as serial ports 120 and/or Ethernet ports 130, may be reserved as slave ports for the connection of downstream IEDs. Alternatively, any of ports 120, 130, and 140 may be configurable as master or slave ports. According to another alternative embodiment, each of ports 120, 130, and 140 may be interchangeably used as master and slave ports by a connected device, as appropriate during various communication sessions. That is, any one of IEDs 161-166 may be considered a slave device during a communication session in which access device 150 is issuing commands. However, the same IED may be considered a master device during a communication session in which an operator uses that same IED to access another IED on the network.

An operator of access device 150 may initiate a communication session with session manager 110 by providing unique login credentials. Session manager 110 may analyze the login credentials to determine what authorization level should be accorded the operator. The authorization level may be used to determine which IEDs 161-166 may be accessed by the operator and/or what access level the operator has on each IED.

During the communication session, the operator may submit a request to communicate with, for example, IED 161. Session manager 110 may then initiate a communication session between IED 161 and session manager 110. The operator may then transmit commands intended for IED 161 to session manager 110. Session manager 110 may then forward the commands to IED 161.

According to various embodiments, session manager 110 may be configured to act as a proxy for communications with any of IEDs 161-166. Accordingly, session manager 110 may maintain two independent communication sessions: a first communication session with access device 150 and a second communication session with one of IEDs 161-166. Additionally, session manager 110 may include a session filter configured to suppress commands transferred by access device 150 to a target IED that are outside the authorization level of the operator of access device 150. For example, given that session manager 110 independently manages the login credentials for each of IEDs 161-166, the session filter may automatically suppress any commands attempting to alter the login credentials of any of IEDs 161-166.

According to one embodiment, session manager 110 may provide an operator of access device 150 with a list of IEDs that are within the authorization level of the received login credentials. IEDs outside of the authorization level of the received login credentials may remain effectively hidden from the operator of access device 150. Moreover, the operator of access device 150 may be unaware of how many other IEDs are connected. Accordingly, the operator of access device 150 may only be aware of those IEDs on the list provided by session manager 110. A session filter may suppress commands transmitted to the listed IEDs that are outside of the access level associated with the authorization level of the operator of access device 150. Additionally, the session filter may suppress any attempt by the operator of access device 150 to communicate with an IED that is not on the list of IEDs provided by session manager 110.

According to various embodiments, session manager 110 may include a protocol translator configured to translate between various communications protocols and physical communications media. For example, session manager 110 may allow for communication between a first device connected to session manager 110 using Ethernet and a second device connected to session manager 110 using a serial connection. For example, access device 150 may communicate using IP packets over Ethernet cable 145, while IED 164 may utilize RS-232 over serial cable 124. Session manager 110 may perform all conversions involved in the communication, such that the conversions and/or translations are transparent to the operator using access device 150.

Gateway session managing system 100 includes a single access device 150; however, according to alternative embodiments, any number of access devices may be in communication with session manager 110. Additionally, according to various embodiments, an access device may be an IED. Accordingly, any of IEDs 161-166 may be configured to also perform the functions of an access device. Moreover, session manager 110 may include any number of wired and/or wireless ports, may utilize any number of protocols, and/or may include a built-in access device. A computer, a server, or other electronic device, including an IED, may be modified using hardware, firmware, and/or software in order to perform the functions of session manager 110, as described herein.

Figure 2:
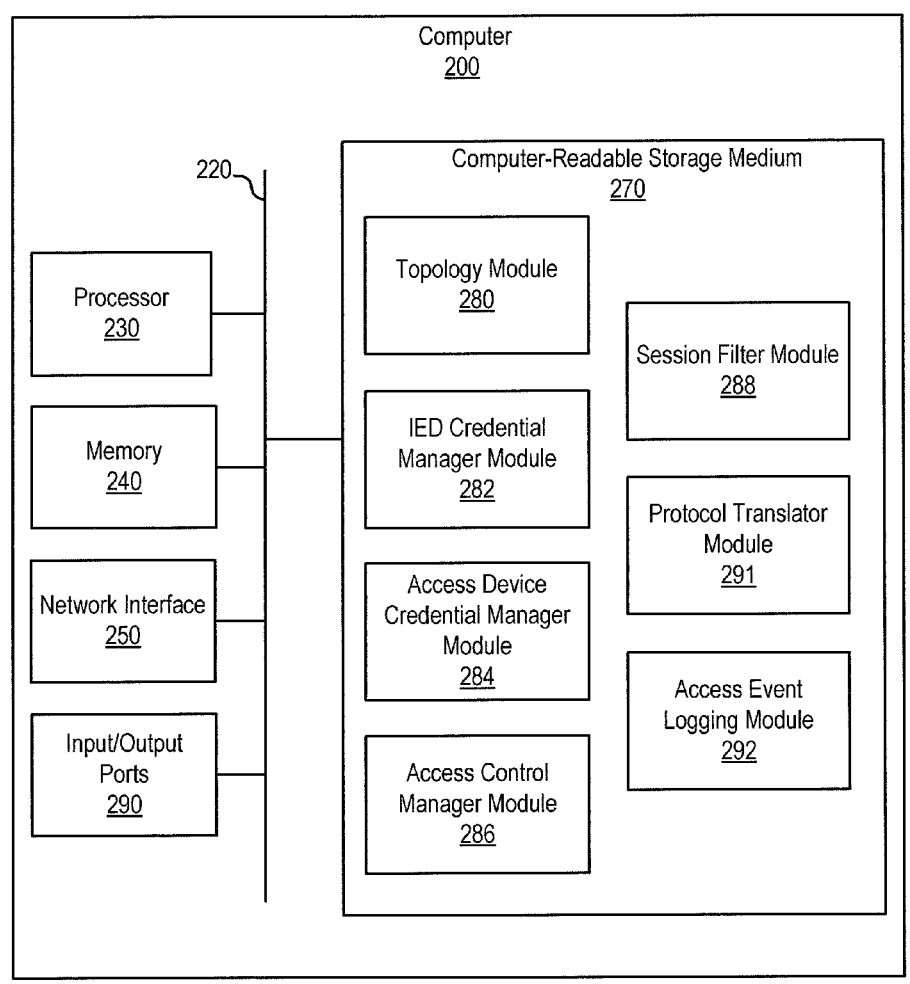
FIG. 2 illustrates one embodiment of a functional block diagram of a computer system configured to manage the login credentials and communication sessions between an access device and one or more IEDs.

FIG. 2 illustrates one embodiment of a functional block diagram of a computer system 200, configured to function as a session manager. Computer system 200 may be configured to manage communication sessions between one or more access devices and one or more IEDs. As illustrated, computer system 200 may include a processor 230, memory (RAM) 240, a network interface 250, and a computer-readable storage medium 270, which are all connected via a system bus 220.

Processor 230 may be configured to process communications received via network interface 250 and input/out ports 290. Processor 230 may operate using any number of processing rates and architectures. Processor 230 may be configured to perform various algorithms and calculations described herein. Processor 230 may be embodied as a general purpose integrated circuit, an application specific integrated circuit, a field-programmable gate array, and other programmable logic devices.

Network interface 250 and input/output ports 290 may allow for communication between computer system 200 and a plurality of connected IEDs and operator access devices. Network interface 250 may be embodied using a variety of interfaces for various types of physical media (e.g., optical fiber, twisted pair, or coaxial cable). Further, network interface 250 may be configured to allow communications according to a variety of communications protocols and speeds. According to various embodiments, multiple network interfaces may be utilized, in order to allow for communication with multiple IEDs or other network components.

Input/output ports 290 may be configured to allow for communication between computer system 200 and a plurality of other devices, such as IEDs. Input/output ports 290 may be embodied, for example, as RS-232 connections, USB connections, IEEE 1394, and the like. A plurality of input/output ports 290 may be provided in order to facilitate communication with a plurality of devices.

According to various embodiments, computer-readable storage medium 270 may include modules 280-292. According to various embodiments, each of modules 280-292 may be alternatively implemented using hardware, firmware, software, or a combination thereof.

Topology module 280 may be configured to identify and maintain a record of the interconnections between each networked device, including IEDs, access device(s), and/or other network elements. According to various embodiments, when a connection request is made by an access device, topology module 280 may be configured to determine a communication path that may include one or more intermediary IEDs or other network devices, and to create a communication path that may be utilized in order to communicate with the requested IED. Where multiple network devices are included in the communication path, computer system 200 may successively log on to each intermediary device in order to initiate a communication session with the requested IED.

IED credential manager module 282 may be configured to generate and set secure credentials for one or more of IEDs connected to computer system 200. According to various embodiments, IED credential manager module 282 may be configured to set random login credentials for each IED and store them in an internal table. According to some embodiments, if an IED supports more than one access level, IED credential manager module 282 may set login credentials for each access level. Additionally, IED credential manager module 282 may be configured to monitor the age of the login credentials associated with each IED and update them at a specified time interval. For example, the login credentials may be updated weekly, monthly, or annually.

Access device credential manager module 284 may be configured to manage the login credentials of one or more access devices and/or operators. Each access device and/or operator may have unique login credentials. According to one embodiment, login credentials comprise a username and at least one password. Alternatively, each login credential may include any of a wide variety of authentication mechanisms. Access device credential manager module 284 may be configured to prompt an operator and/or access device to reset and/or update the unique login credentials at specified time intervals. Alternatively, access device credential manager module 284 may be configured to automatically select and update the login credentials for access devices and/or operators.

Access control manager module 286 may be configured to determine the authorization level of an access device and/or operator based on the provided login credentials. For example, when an operator attempts to initiate a communication session with computer system 200 via an access device, the operator may be required to provide unique login credentials. Access control manager module 286 may determine with which networked IEDs the operator is allowed to communicate. Additionally, access control manager module 286 may be configured to generate a blacklist of commands that the operator should not be able to transmit to specific IEDs and/or with what access level an operator should be allowed to communicate with an IED. Similarly, access control manager module 286 may be configured to generate a whitelist of commands that the operator may transmit to specific IEDs.

Additionally, access control manger module 286 may support user-defined virtual commands. According to various embodiments, a virtual command may include a set of custom commands configured to request data from an IED and then return the requested data in a user specified format. For example, an IED may only support a specific set of basic commands. Access control manager module 286 may allow an operator to define a custom virtual command as a set of basic commands to be performed in a predefined sequence. An operator may enter a virtual command and access control manager module 286 may then transmit the predefined set of basic commands in the predefined sequence to an IED. Additionally, data may be returned to the operator or access device in user-specified format.

Commands transmitted by an operator to a target IED may be suppressed by session filter module 288 if the commands exceed the operator's authorization level. For example, commands transmitted by an operator intended for an IED that are on a blacklist generated by access control manager module 286 may be suppressed. Alternatively, commands transmitted by an operator may be suppressed if they are not on a whitelist generated by access control manager module 286. According to one embodiment, commands attempting to change the login credentials of networked IEDs are suppressed by a session filter. Access control manager module 286 may also be configured to suppress commands that may result in interruption of electrical service or damage to an electric power delivery system.

According to various embodiments, IEDs, network equipment, and/or access devices may communicate with computer system 200, using a wide variety of protocols and physical hardware. Protocol translator module 291 may be configured to translate commands received in one protocol in order for them to be forwarded to an IED in another protocol, and vice versa. For example, protocol translator module 291 may translate between TCP/IP data transmitted over Ethernet or optical fiber to RS-232 over a serial cable.

Additionally, an access event logging module 292 may be configured to record access events and associated login credentials. According to various embodiments, access events may include attempted or successful login or logout, transmitted command, received command, suppressed command, received information, requested information, transmitted information, and/or other data transmissions between an access device, a session manager, and/or an IED. According to various embodiments, the type and amount of information recorded may be configured by an operator to suit a particular need.

Figure 3:
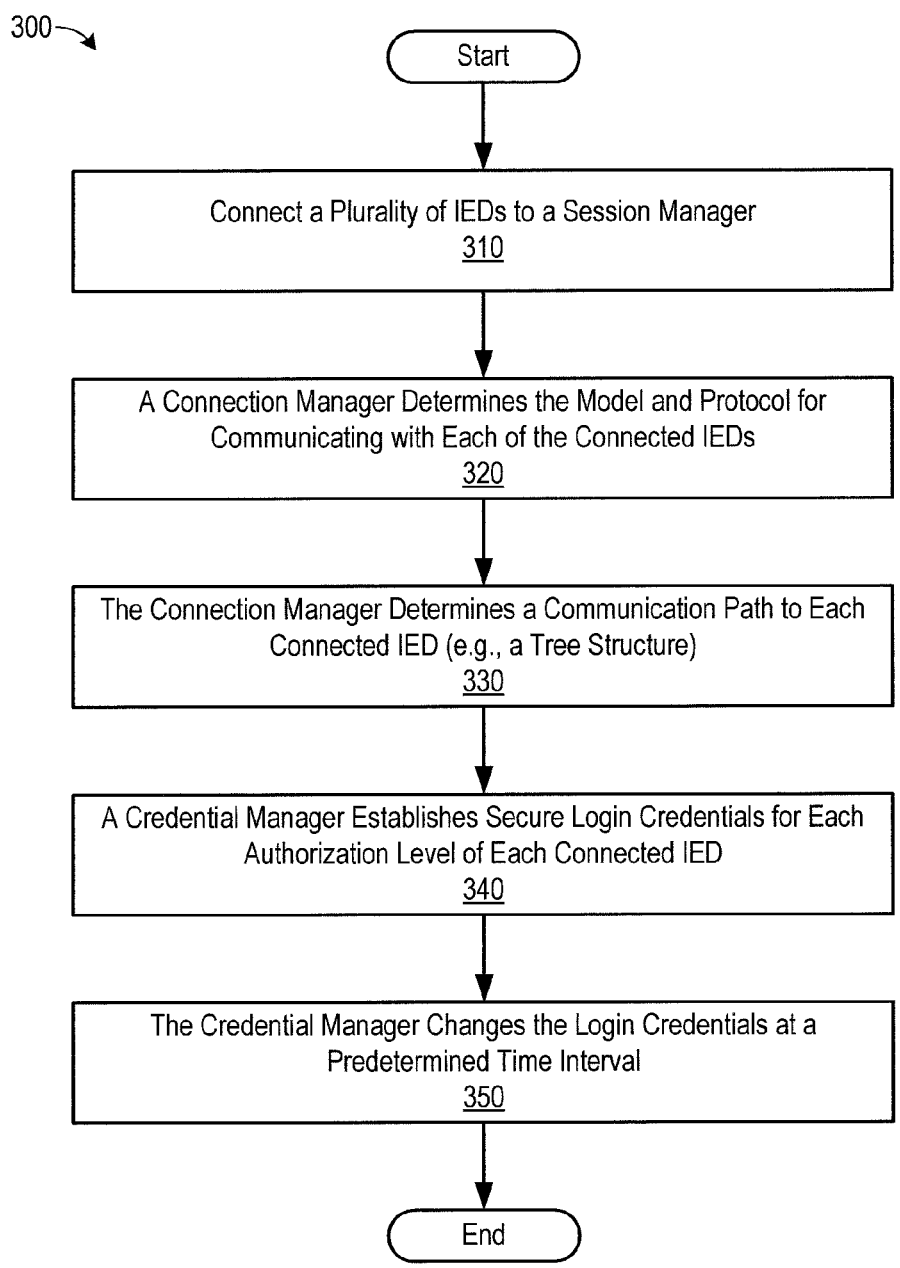
FIG. 3 illustrates one embodiment of a method of establishing and maintaining secure login credentials for each of a plurality of IEDs.

FIG. 3 illustrates one embodiment of a method 300 of establishing and maintaining secure login credentials for each of a plurality of IEDs. Each of the plurality of IEDs is connected to a session manager, at 310. According to various embodiments, IEDs may be connected to a session manager using any of a wide variety of physical connections or using a wireless connection. The session manager may include a connection manager that determines the model and protocol for communication with each of the connected IEDs, at 320. For example, a tree model representing the topology of a plurality of networked IEDs may be maintained.

According to various embodiments, the session manager may be capable of using and translating between a wide variety of communication protocols, including RS-232 and packet based data protocols. The connection manager may also determine a communication path to each connected IED, at 330.

A credential manager may establish secure login credentials for various authorization levels of each connected IED, at 340. According to various embodiments, each IED may require that login credentials, such as a username and password, be supplied in order to access the IED. For example, an IED may be configured to monitor portions of a power distribution system and automatically control a breaker. The IED may require an operator to provide a username and password to prevent unauthorized access.

The credential manager may also monitor the age of the login credentials of each of the plurality of IEDs and change the login credentials at a specified time interval, at 350. For example, federal regulations may mandate that an IED's login credentials be reset annually. By automatically resetting the login credentials of all the networked IEDs at a specified time interval, the session manager may automate what is otherwise a complex and time consuming manual process.

According to various embodiments, the credential manager may generate random login credentials for each connected IED and store the credentials in an internal database. Legacy IEDs may not offer the same security controls as modern IEDs. For example, a legacy IED may only allow for a single login credential, such as a single username/password combination that grants unrestricted access to the IED. In contrast, more modern IEDs may allow for multiple username/passwords combinations having configurable access levels. Moreover, the length and character set available for creating login credentials may vary greatly from one IED to another. The credential manager may be configured to interact appropriately with each type of IED, independent of the security standards used by the particular IED.

Figure 4:
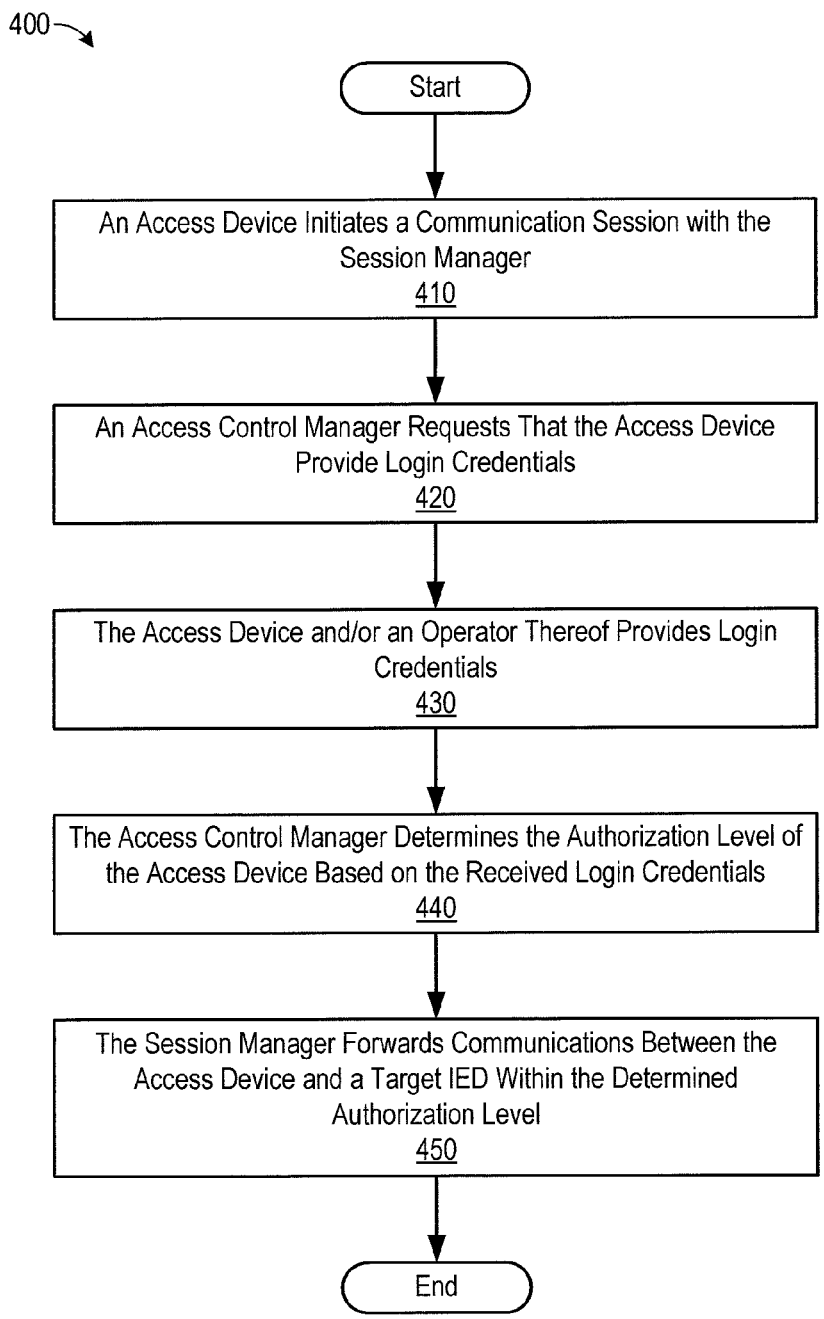
FIG. 4 illustrates one embodiment of a method of initiating a communication session between an access device and a session manager.

FIG. 4 illustrates one embodiment of a method 400 of initiating a communication session between an access device and a session manager. At 410, an access device initiates a communication session with a session manager. An access control manager within the session manager requests that the access device provide login credentials, at 420. The access device and/or an operator thereof provides login credentials, at 430. According to various embodiments, the access control manager may request login credentials for the machine being used as an access device, the login credentials of the operator of the access device, or both. Thus, according to some embodiments, a session manager may only be accessible by access devices known to the session manager. Alternatively, the session manager may allow access, so long as the operator of the access device is able to provide authorized login credentials.

The access control manager may then determine the authorization level of the access device for the initiated communication session based on the received login credentials, at 440. That is, the session manager may provide access to networked IEDs, based on the login credentials of the access device and/or operator. For example, a given operator may be given varying levels of access to each of the networked IEDs. The operator may have full access to some of the IEDs and limited access to some IEDs, and may be prevented entirely from interacting with still other IEDs.

The session manager may forward communications between the access device and a target IED within the determined authorization level, at 450. According to various embodiments, the session manager does not facilitate a communication session between the access device and an IED. Rather, the session manager may maintain a first communication session with the access device and initiate a second communication session with a target IED. Accordingly, the session manager forwards commands transmitted by the access device in the first communication session to a target IED in the second communication session, so long as the target IED is within the determined authorization level.

According to various embodiments, a session manager may maintain a first communication session with an access device and multiple communication sessions with various target IEDs. Additionally, a session manager may facilitate communication between multiple access devices and multiple IEDs simultaneously. That is, multiple access devices may utilize the functionality of the session manager without necessarily being aware of one another. For example, two access devices may be able to simultaneously communicate with a single IED or two separate IEDs. According to various embodiments, concurrent or simultaneous access is provided through a single communication port. For example, a single Ethernet port may support communication between multiple access devices and the session manager and/or an IED.

Figure 5:
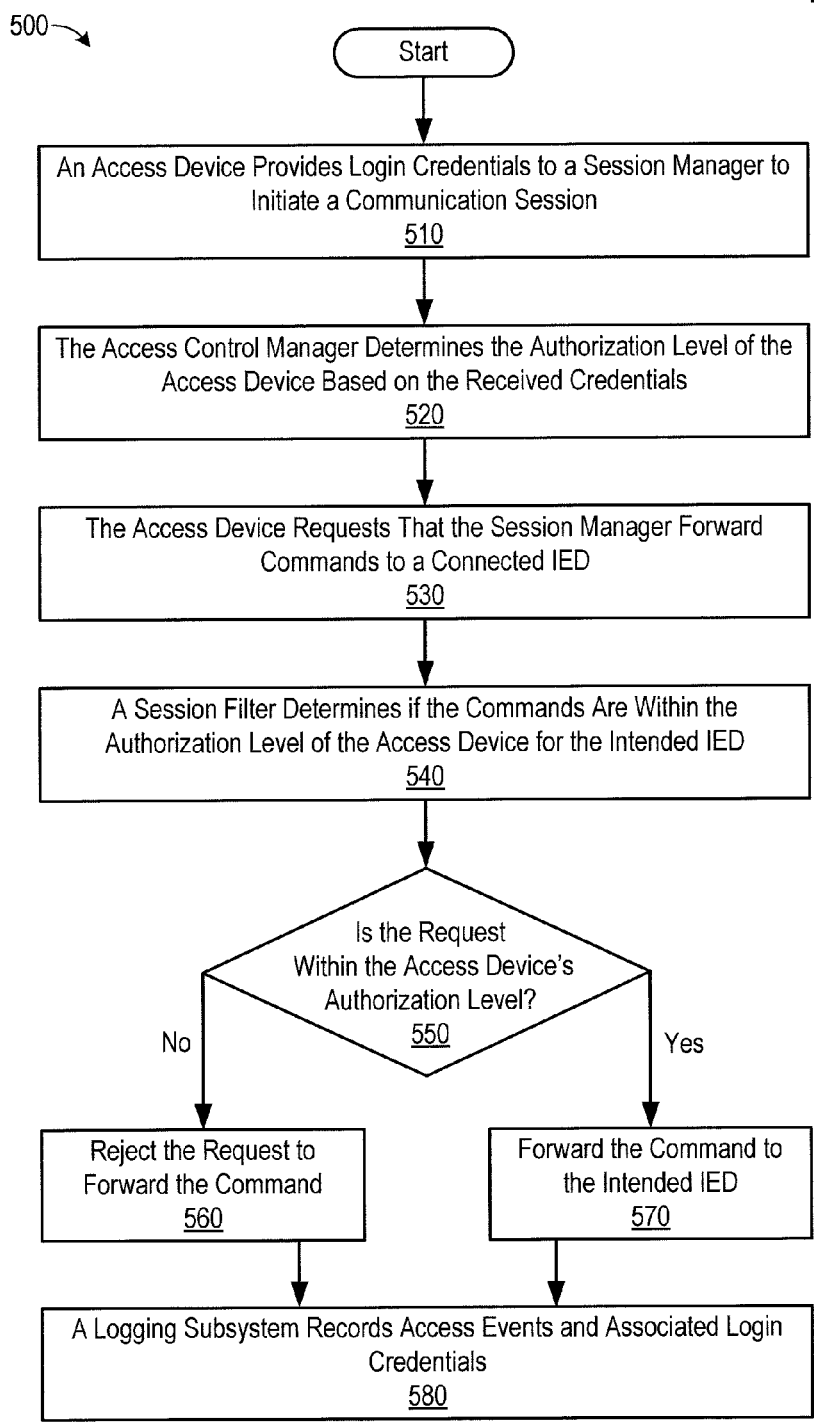
FIG. 5 illustrates one embodiment of a method of initiating a first communication session between an access device and a session manager and a second access-controlled communication session between an IED and the session manager.

FIG. 5 illustrates one embodiment of a method 500 of initiating a first communication session between an access device and a session manager and a second access-controlled communication session between an IED and the session manager. At 510, an access device provides login credentials to a session manager in order to initiate a communication session. The access control manager of the session manager determines the authorization level of the access device based on the received credentials, at 520. The authorization level granted may depend on the login credentials of the physical machine used as an access device, the login credentials of an operator of the access device, or a combination thereof.

According to various embodiments, a session manager provides varying levels of access to each connected IED, depending on the authorization level of the access device and/or operator. According to some embodiments, a session manager may utilize the built-in differentiated access levels of modern IEDs in order to provide an access device limited access to some IEDs. Additionally, a session manager may include a session filter configured to suppress commands and communications between an access device and an IED that are not within the authorization level of the access device and/or operator thereof.

For example, it may be desirable that a particular operator be given administrative privileges on some IEDs, the privileges of a high level operator on other IEDs, and the privileges of a low level operator on other IEDs. If the operator desires to communicate with a particular IED, the session manager may initiate a communication session with the IED that corresponds to the authorization level of the operator. Such a model works so long as the IED supports differentiated access levels. For legacy IEDs that do not support differentiated access levels, a session filter built into the session manager may suppress communication that is not within the authorization level of the access device. Accordingly, a session manager may effectively provide legacy IEDs with differentiated access levels through the use of a session filter.

At 520, the authorization level may be determined, and the access device may request that the session manager forward commands to a connected IED, at 530. A session filter may determine at 540 if the commands are within the authorization level of the access device for the target IED. If the request is within the access device's authorization level, at 550, the session manager may forward the command to the target IED, at 570. However, if the request is beyond the access device's authorization level, at 550, the session manager may reject the request to forward the command, at 560.

According to various embodiments, a session manager may include a logging subsystem. Accordingly, the logging subsystem may record access events and associated login credentials, at 580. According to various embodiments, the recorded access events may include any attempted or successful login, logout, transmitted command, received command, suppressed command, received information, requested information, transmitted information, and/or other data transmissions between an access device, a session manager, and/or an IED. According to various embodiments, the type and amount of information recorded may be adapted to suit a particular need.

Figures 6A, 6B:
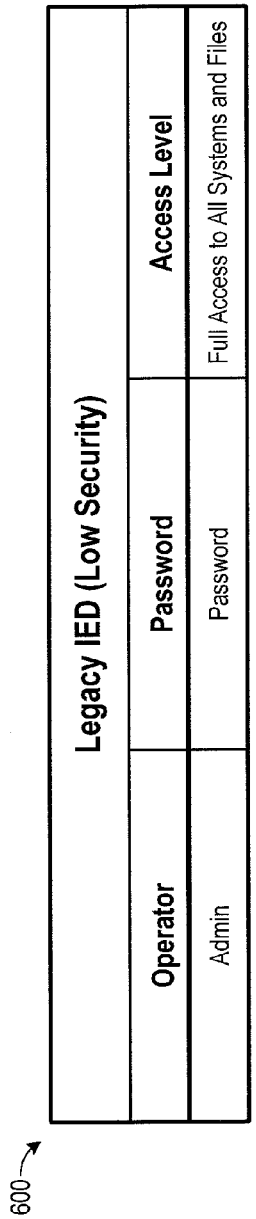
FIGS. 6A and 6B illustrate embodiments of representative tables of the credential management of a legacy IED and that of a modern IED with improved security, respectively.

FIGS. 6A and 6B illustrate embodiments of representative tables of the credential management of a legacy IED 600 and a modern IED 650 with improved security. As previously discussed, a modern IED 650 may allow for differentiated levels of access based on login credentials, while a legacy IED 600 may provide either no access or unlimited access. As illustrated in FIG. 6A, a legacy IED may provide full access to all systems and files upon authentication using a username and password. Additionally, the length and character set used to create the username and password may be limited.

In contrast, an improved IED 650 may allow for multiple username and password combinations, each with varying levels of access. As illustrated in FIG. 6B, possible access levels may include variations on an operator's ability to read and write to systems and files within the IED. FIGS. 6A and 6B are merely examples of possible username, password, and access level combinations. According to various embodiments, IEDs may utilize alternative login credential paradigms and may include more defined access levels.

FIG. 7 illustrates a representative table 700 for managing the passwords and connections of a plurality of IEDs to one embodiment of a session manager. As previously discussed, a session manager may manage the login credentials, the type, the connection, and the available levels of access for each of a plurality of connected IEDs. The session manager may generate and automatically update the login credentials for multiple access levels (when available) of each connected IED. As illustrated in the first column of the table 700, IEDs 1-N may be connected to the session manager. IED 1 and N may be legacy devices (second column) connected via serial cables (third column). These legacy IEDs may support only a single access level equivalent to that of an administrator (fourth column). Accordingly, a username (fifth column) and password (sixth column) may be generated, stored, and updated periodically for each IED.

IEDs 2 and 3 (first column) may be improved or modern IEDs (second column) connected to the session manager via Ethernet (third column). As illustrated, IED 2 may support five levels of access (fourth column) predefined as admin, high level, medium level, low level, and customized. IED 3 may also support numerous levels of access (fourth column), each of which is customizable. The session manager may generate, store, and periodically update usernames and passwords for each access level of IED 2 and for any number of access levels for IED 3.

FIG. 8 illustrates a representative table 800 for managing the login credentials and associated authorization level granted to each of a plurality of operators by a session manager. The first and second column of table 800 represent the access device and/or operator login credentials. According to various embodiments, each operator may have a unique username, listed in the first column of table 800 as Operator 1 through Operator N, and a unique password, listed in the second column of table 800. The login credentials of an access device and/or operator may comprise any number of possible authentication schemes, and are not limited to username/password combinations.

An authorization level for each connected IED is associated with each operator's login credentials. Using the first row as an example, the authorization level associated with the login credentials "Operator 1" and "Password 1" provides the operator administrative access to IED 1, medium level access to IED 2, low level access to IED 3, and administrative access to IED N. As another example, the operator associated with the username "Operator 3" and the password "Password 3" is only allowed low level access to both IED 2 and IED 3.

As previously described, legacy IEDs may not provide differentiated levels of access. Accordingly, all of the operators in FIG. 8 are given administrative access to IED 1 and IED 2 since the only alternative is no access at all.

FIG. 9 illustrates a representative table 900 for managing login credentials and associated authorization levels granted to each of a plurality of access devices by a session manager, including a session filter. According to various embodiments and as previously described, a session filter may effectively provide legacy IEDs with differentiated access levels. For example, IED 1 an IED N are listed as legacy devices (third column). Accordingly, the only available level of access for IED 1 and IED N is either administrative or none (see the fourth column of both FIGS. 7 and 9). Again, using a session filter to suppress specific commands, a legacy IED is able to appear to support differentiated access levels.

For example, the operator in the second row associated with username "Operator 2" (first column) and password "Password 2" (second column) is provided administrative access to IED 1 and IED 2 (fourth column). However, the session filter suppresses commands such that the operator is effectively a high level operator of IED 1 and a medium level operator of IED N. According to various embodiments, a session filter may be configured to suppress all commands relating to changes in the login credentials of the IEDs themselves.

The above description provides numerous specific details for a thorough understanding of the embodiments described herein. However, those of skill in the art will recognize that one or more of the specific details may be omitted, modified, and/or replaced by a similar process or system.

What is claimed:

1. A method for managing login credentials and communication sessions of a plurality of intelligent electronic devices (IEDs), comprising:
   connecting each of a plurality of IEDs to a session manager, the plurality of IEDs comprising a first subset and a second subset, the first subset of IEDs being the only IEDs in the plurality of IEDs to support an advanced security feature;
   generating a plurality of login credentials for each of the plurality of IEDs using the session manager;
   storing the plurality login credentials in a database accessible by the session manager;
   creating a first communication session between the session manager and an operator access device, the operator access device requesting access to an IED in the second subset;
   creating a second communication session between the session manager and the requested IED by the session manager providing login credentials of the requested IED; and
   simulating the advanced security feature by using the session manager as a proxy for communications between the first communication session and the second communication session, the session manager enforcing the advanced security feature in the second communication session.

2. The method of claim 1, wherein the plurality of login credentials each comprise a username and a password.

3. The method of claim 1, wherein generating the plurality of login credentials for each of the plurality of IEDs comprises generating unique login credentials for a plurality of access levels of at least one of the plurality of IEDs.

4. The method of claim 1, wherein connecting each of the plurality of IEDs comprises connecting each IED to the session manager using at least one of an Ethernet cable, a serial cable, a coaxial cable, an optical cable, and a wireless connection.

5. The method of claim 1, wherein simulating the advanced security feature further comprises:
   associating a plurality of operator login credentials with a plurality of operators, each of the plurality of operator login credentials having an authorization level specifying the access level of the associated operator.

6. A method of claim 5, further comprising:
   receiving one of the plurality of operator login credentials by the session manager;
   determining the authorization level of the received operator login credentials using the session manager.

7. The method of claim 6, further comprising:
   receiving a request from the operator access device to communicate with a connected IED within the authorization level of the received operator login credentials; and
   the session manager selectively relaying communications received from the operator access device in the first communication session to the requested IED in the second communication session.

8. The method of claim 6, further comprising:
   suppressing communications between the operator and the IED that exceed the authorization level of the operator.

9. The method of claim 6, further comprising recording access events associated with the login credentials of the operator using the session manager.

10. The method of claim 6, further comprising the session manager:
    providing the operator access device with a list of connected IEDs;
    receiving a request from the operator access device to communicate with one of the listed IEDs within the authorization level of the received operator login credentials;
    initiating a second communication session between the session manager and the requested IED by the session manager providing login credentials of the requested IED; and
    selectively relaying communications received from the operator access device in the first communication session to the requested IED in the second communication session.

11. The method of claim 10, wherein the list comprises only those IEDs within the authorization level of the received operator login credentials.

12. The method of claim 1, further comprising translating a first data protocol to a second data protocol.

13. The method of claim 1, wherein the advanced security feature comprises one of an expanded character for use in connection with the plurality of logic credentials.

14. The method of claim 1, wherein the advanced security feature comprises requiring a user to update an associated login credential at a specified time interval.

15. A session manager for managing login credentials and communication sessions of a plurality of intelligent electronic devices (IEDs), comprising:
    a bus;
    a processor in communication with the bus;
    a plurality of ports in communication with the bus and configured to allow for the connection of a plurality of IEDs to the session manager, the plurality of IEDs comprising a first subset and a second subset, the first subset of IEDs being the only IEDs in the plurality of IEDs to support an advanced security feature; and
    a computer-readable storage medium in communication with the bus, the computer-readable storage medium comprising:
      an IED credential manager module executable on the processor and configured to:
        generate login credentials for each connected IED;
        store the login credentials of the connected IEOs in a database accessible to the session manager;
        initiate a first communication session between the session manager and an operator access device, the operator access device requesting access to an IED in the second subset;

initiate a second communication session between the session manager and the requested IED by the session manager providing login credentials of the requested IED;
simulate the advanced security feature by proxying communications between an IED in the second subset of IEDs and an operator access device, the session manager configured to enforce the advanced security feature in communication with the operator access device; and
the session manager accessing the IED in the second subject of IEDs using the plurality of login credentials.

16. The session manager of claim 15, wherein the plurality of login credentials each comprise a username and a password.

17. The session manager of claim 15, wherein the IED credential manager module is configured to generate login credentials for a plurality of access levels of at least one of the plurality of IEDs.

18. The session manager of claim 15, wherein the plurality of ports comprises at least one of an Ethernet port, a serial port, a coaxial port, an optical port, and a wireless port.

19. The session manager of claim 15, wherein the computer-readable storage medium further comprises:
an access device credential manager module executable on the processor and configured to associate a plurality of operator login credentials with a plurality of operators, each of the plurality of operator login credentials having an authorization level specifying the access level of at least one of the plurality of IEDs.

20. The session manager of claim 19, wherein the computer-readable storage medium further comprises:
an access control manager module executable on the processor and configured to:
receive one of the plurality of operator login credentials from an operator access device; and
determine an authorization level of the operator login credentials.

21. The session manager of claim 20, wherein the access control manager module is further configured to:
receive a request from the operator access device to communicate with an IED within the authorization level of the received operator login credentials; and
relay communications received from the operator access device in the first communication session to the requested IED in the second communication session.

22. The session manager of claim 20, wherein the computer-readable storage medium further comprises:
a session filter module executable on the processor and configured to suppress communications that exceed the determined authorization level of the provided operator login credentials.

23. The session manager of claim 20, wherein the access control manager module is further configured to:
provide the operator access device with a list of IEDs;
receive a request from the operator access device to communicate with one of the listed IEDs within the authorization level of the received operator login credentials; and
relay communications received from the operator access device in the first communication session to the requested IED in the second communication session.

24. The session manager of claim 23, wherein the list comprises only those IEDs within the authorization level of the received operator login credentials.

25. The session manager of claim 19, wherein the computer-readable storage medium further comprises:
an access event logging module executable on the processor and configured to record access events associated with the provided operator login credentials.

26. The session manager of claim 15, wherein the computer-readable storage medium further comprises:
a protocol translator module executable on the processor and configured to translate a first data protocol to a second data protocol.

* * * * *